United States Patent

[11] 3,539,132

| | | |
|---|---|---|
| [72] | Inventor | Louis A. Smitzer<br>San Diego, California |
| [21] | Appl. No. | 695,003 |
| [22] | Filed | Jan. 2, 1968 |
| [45] | Patented | Nov. 10, 1970 |
| [73] | Assignee | Stromberg Datagraphix, Inc.<br>San Diego, California<br>a corporation of Delaware |

[54] FILM HANDLING SYSTEM AND TAKEUP AND SUPPLY MECHANISM THEREFOR
7 Claims, 8 Drawing Figs.

[52] U.S. Cl. .................................................. 242/195,
242/71.1, 242/71.8, 242/76, 242/197, 242/201
[51] Int. Cl. ...................................................... G11b 23/10;
G03b 1/04, G03b 1/56
[50] Field of Search ..........................................
242/55.13(T), 55.11(PT), 55.13, 71.1, 76, 71.8,
138, 195, 197, 198, 201, 202, 203, 206, 207;
352/157, 156

[56] References Cited
UNITED STATES PATENTS

| 3,126,161 | 3/1964 | Bemiss et al. | 242/55.13(T) |
|---|---|---|---|
| 3,149,797 | 9/1964 | Pastor et al. | 242/55.13(T) |
| 3,150,840 | 9/1964 | Briskin et al. | 242/55.13(T) |
| 3,254,856 | 6/1966 | Camras | 242/55.13(T) |
| 3,348,784 | 10/1967 | Gardiner et al. | 242/55.13(T) |

FOREIGN PATENTS

| 881,270 | 11/1961 | Great Britain | 242/55.13(T) |

*Primary Examiner*—George F. Mautz
*Attorney*—Anderson, Luedeka, Fitch, Even & Tabin ABSTRACT: A film handling system is described for utilizing resilient film having a region of enlarged width proximate one end. A supply mechanism stores the film, and the film is transported from the supply mechanism to a takeup mechanism. The takeup mechanism used in the system includes a takeup reel with flanges spaced greater than the width of the film but less than the width of the enlarged region thereof. The takeup reel rotates with a tangential velocity near the periphery thereof greater than the longitudinal velocity at which the film is fed between the flanges of the reel. The enlarged region of the film is captured frictionally between the flanges and the film is drawn onto the takeup reel.

Patented Nov. 10, 1970

3,539,132

INVENTOR
Louis A. Smitzer

BY Anderson, Luedeka, Fitch, Even, & Tabin ATTYS.

FILM HANDLING SYSTEM AND TAKEUP AND SUPPLY MECHANISM THEREFOR

This invention relates to film handling and, more particularly, to a film handling system and to a supply mechanism and a takeup mechanism for use therein.

Various types of apparatus utilize film or tape which is wound upon and unwound from storage reels. Examples of such apparatus are microfilm readers, motion picture cameras and projectors, and magnetic tape recorders. In such devices, film is removed from a supply reel, transported past a viewing device, lens, or pickup head, and wound upon a takeup reel. It is sometimes desirable in such types of apparatus that the film or tape handling system be automatic so that manual handling of the film or tape (hereinafter referred to generically as film) is unnecessary.

Heretofore, automatic film handling systems of the type described have sometimes incorporated complex expedients for automatically withdrawing film from a supply reel, threading it through a viewing device or analogous structure, and automatically taking up the film on a takeup reel. Such complex expedients are often excessively expensive and may be subject to functional difficulties necessitating frequent repair. The foregoing problems may be compounded where it is desired that the film be stored in a "cartridge" which is "plugged" into the system.

It is an object of this invention to provide an improved film handling system.

Another object of the invention is to provide an improved takeup mechanism for use in a film handling system.

It is another object of the invention to provide an improved supply mechanism for use in a film handling system.

A further object of the invention is to provide a film handling system, and a supply mechanism and takeup mechanism for use therein, all of which are simple of construction and reliable of operation.

Other objects of the invention will become apparent to those skilled in the art from the following description taken in connection with the accompanying drawings wherein.

Figure 3:
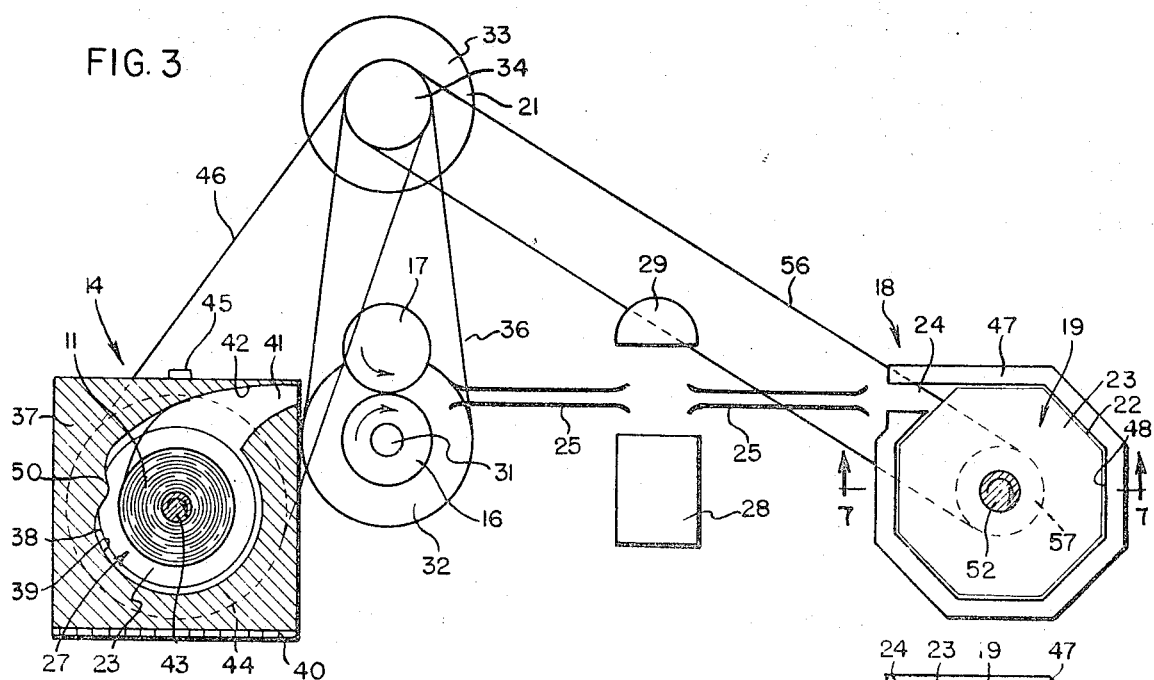
FIG. 3 is a schematic sectional view of a film handling system constructed in accordance with the invention.

Very generally, the film handling system of the invention comprises resilient film 11 having one or more regions 12 of enlarged width proximate an end 13. A supply mechanism 14 is provided for storing a supply of film. Means 16 and 17 are provided for transporting the film from the supply mechanism. A takeup mechanism 18 is provided for receiving the film from the transporting means. The takeup mechanism includes a takeup reel 19 and means 21 for rotating the takeup reel with a tangential velocity near the periphery 22 thereof which is higher than the longitudinal velocity at which the transporting means move the film. The takeup reel has flanges 23 which are spaced greater than the width of the film but less than the width of the enlarged region of the film. Means 24 are provided for directing the film between the flanges of the takeup reel near the periphery thereof to be captured frictionally between the flanges at the enlarged region of the film and thereby drawn onto the takeup reel.

Figure 2:
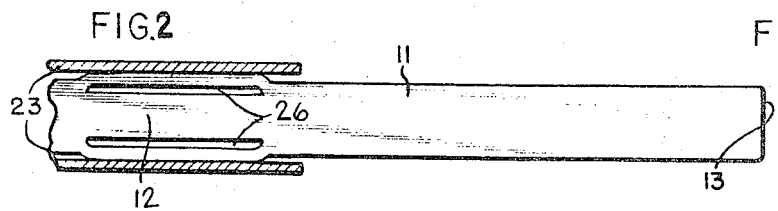
FIG. 2 is a view similar to FIG. 1 illustrating an alternative configuration of the film in accordance with the invention.
Figure 1:
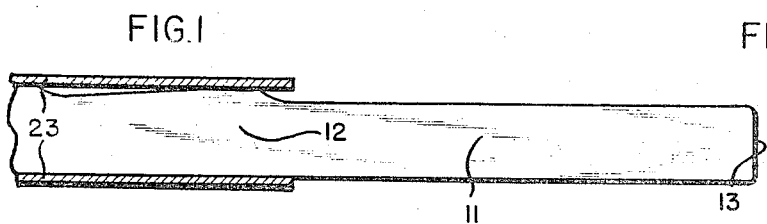
FIG. 1 is a top view of a portion of film and a portion of a storage reel therefor, illustrating relative sizes.

Referring now more particularly to FIGS. 1 and 2, the film utilized in the film handling system of the invention may be of any type having a sufficient amount of resilience in itself or in a suitable leader portion, to function as described below. One or more regions 12 of enlarged width are provided near one end 13 of the film for reasons which will be subsequently explained. Preferably, the enlarged width is achieved by splicing on to the end of the film a leader portion which is entirely of enlarged width and trimming it except for the desired regions, as shown in FIG. 1. Alternatively, parallel slits provided in the film or in an attached leader portion may be expanded as in FIG. 2 to cause the width of the film to be greater in the region 12. As further alternatives, suitable clips, inserts or similar devices of the proper width and resilience may be attached to the film or leader portion near one end.

Referring now to FIG. 3, the film handling system of the invention is shown in connection with a microfilm reader. The film 11 is stored on storage reels, one of which, 19, is a takeup reel and the other of which, 27, is a supply reel. The supply reel 27 is part of the supply mechanism 14, and the takeup reel 19 is part of the takeup mechanism 18. Between the supply mechanism and the takeup mechanism, the film 11 is moved through guides 25 and passed by a lens 28 and a projection lamp 29 for projecting the film on a screen, not shown. Transportation of the film between the supply and takeup mechanisms is accomplished by a capstan 16 and pinch roller 17, positioned adjacent the supply mechanism 14. The capstan is mounted on a spindle 31 driven by a pulley 32. The pulley 32 is driven by a motor 33, being coupled to a motor drive pulley 34 by a belt 36.

The supply mechanism 14 includes a housing 37 of the cartridge type. Suitable means, not illustrated, are provided for supporting the housing against rotation. The housing 37 defines an interior chamber 38 having a curved inner surface 39. A passage 41 communicates with the chamber 38 from outside the housing 37. The upper surface 42 of the passage 41 extends tangentially from the curved surface 39. The capstan 16 and pinch roller 17 are adjacent the exterior opening of the passage 41 to grasp the film and withdraw it from the housing 37. The point of engagement of the capstan 16 and the pinch roller 17 is approximately aligned with the passage surface 42.

The housing 37 contains the supply reel 27 therein. The supply reel 27 includes the flanges 23 and a hub 43 upon which the film 11 is wound. The supply reel is free to rotate in the housing and is driven by a drive pulley 44 which is driven by a belt 46 from the motor 33. The hub 43 is driven by a spindle (not shown) which projects through an opening (also not shown) in the housing 37. The spindle is driven by the pulley 44 and is removably coupled to the hub 43, thereby permitting the supply mechanism to be "plugged" into the system. Rotation is in the direction of the arrows in the drawing. The housing 37 is in separable halves which are hinged by a hinge 40 and secured closed by a latch 45. This permits the reel 27 to be replaced within the housing.

The supply reel 27 has flanges 23 which are spaced wider than the width of the film 11 but less than the width of the enlarged region 12 of the film. Accordingly, the enlarged region 12 is gripped frictionally between the flanges 23. When the film is wound on the supply reel 27, the portion of the film beyond the gripped widened region 12 extends tangentially of the wound film and its resiliency holds the end 13 against the curved surface 39 of the housing. When the supply reel is rotated in the direction of the arrow, as illustrated in FIG. 3, this free end of the film follows the curved surface 39 and enters the passage 41. Continued rotation causes the film to follow the surface 42 and to be gripped by the capstan 16 and pinch roller 17. Once this is accomplished, the film is withdrawn from the supply mechanism by the transporting means.

The tangential velocity at the periphery of the capstan is greater than the longitudinal speed imparted to the film by the rotation of the supply reel 27. A slip clutch (not shown) is provided between the hub 43 and the pulley 44 so that, once the film is engaged by the capstan, the speed of the capstan determines the speed of the film, as is known in the art. The length of the film between the end 13 and the first enlarged portion 12 is sufficient to allow engagement of the end 13 by the capstan before the enlarged region 12 can pass by the passage 41. Thus, the film does not fold over on itself inside the chamber 38.

A hump or projection 50, provided in the curved surface 39, projects between the flanges of the supply reel to force the film leader between the flanges when the film is rewound. Since the hump 50 is only on one side of the chamber 38, the supply reel is easily removed and inserted by tipping appropriately. Thus, when the reel is removed, the side opposite the hump is lifted out first. When the reel is inserted, the side adjacent the hump is inserted first.

The takeup mechanism 18 includes a film guide 47, which may be of plastic or similar material. The film guide is mounted on the viewer housing 55 (FIG. 7) on posts 58 and defines an inner guide surface 48. The inner surface 48 of the film guide is octagonal. As may be seen in FIG. 7, the surface 48 is narrower than the space between the flanges of the takeup reel. The outer surface (the upper surface in FIGS. 3—6) of the guide means or passage 24 extends from the adjacent flat portion of the octagonal surface 48.

Figure 4:
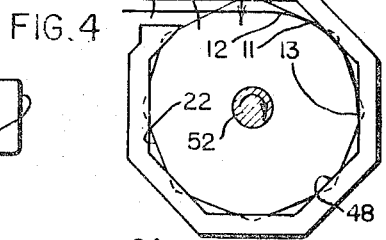
FIGS. 4 through 6 illustrate the takeup mechanism in the system of FIG. 3 in full section and show successive steps in its operation.

The upper one of the flanges (FIG. 7) of the takeup reel 19 is of round outline and is positioned above the film guide. The lower one of the flanges of the takeup reel 19 is of octagonal outline and is slightly smaller than the inner edge of the guide 47 to enable the reel to be removed from and inserted in the film guide. However, when the reel is rotated with respect to the film guide so that the flats of the octagonal guide extend between the upper flange and the points of the octagonal flange, as shown in FIG. 4, the regions of enlarged width of the film are forced between the two flanges to be gripped thereby.

The takeup reel 19 includes a hub 52 upon which the film 11 is wound. As may be seen in FIG. 7, a spindle 53 projects upwardly through an opening 54 in the housing 55, and the hub 52 removably mounts on the spindle. As shown in FIG. 3, the spindle is rotatably driven through a pulley 57 by a belt 56. The motor 33 is utilized to drive the belt 56.

In the takeup mechanism of FIGS. 3—6, the film 11 is urged into the passage 24 in the film guide 47 by the capstan 16. The passage directs the film into the inside of the film guide to be guided by the octagonal surface 48 therein. As the takeup reel 19 rotates, the octagonal surface 48 forces the film between the flanges of the takeup reel near the peripheries thereof.

Figure 5:
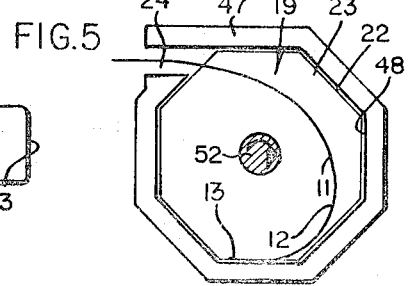

When the widened region 12 passes between the flanges 23 of the takeup reel, it is engaged frictionally by the flanges. The takeup reel is rotated at a speed such that the tangential velocity thereof throughout the radial distance along the flange between the hub 52 and the flange periphery 22 is greater than the longitudinal velocity imparted to the film 11 by the capstan 16. Because of this, the rollers 16 and 17 resist the tendency of the flanges to draw the film linearly at the increased speed. An inward force is applied to the film, however, by the rotation of the flanges cooperating with the drag resulting from the lower feed-in velocity of the film. This tends to move the widened region of the film toward the hub. The movement of the film is indicated sequentially in the FIGS. 3 through 6 and it may be seen that the film eventually surrounds the hub 52 as shown in FIG. 5. Continued rotation of the takeup reel causes the free end of the film to be guided by the surface 48 until it extends under the incoming film near the passage 24. When the film is looped around the hub 52 and slipped under itself as in FIG. 6, continued rotation of the takeup reel tightens the film on the hub. A slip clutch, not shown, is provided to enable the takeup reel to rotate at the slower speed of the incoming film once this happens, as is known in the art.

Figure 7:
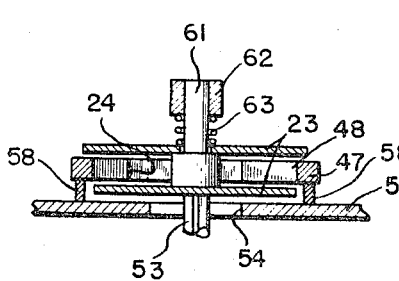
FIG. 7 is a sectional view taken along the line 7-7 of FIG. 3.

Referring now particularly to FIG. 7, provision is made to permit the enlarged portions of film or film leader to lie flat or flush against the hub when wound on the takeup reel, even though the enlarged portions are normally wider than the distance between the flanges. Such provision includes an axle 61 which extends axially from the hub 52 of the takeup reel. A collar 62 is secured to the end of the axle. The upper or circular flange (illustrated in FIG. 7) is not secured to the hub and is provided with an opening through which the axle projects. A coil spring 63 is positioned under compression between the collar 62 and the circular flange to hold the flange against the end of the hub. The spring bias is selected to enable the circular flange to be displaced slightly axially with respect to the hub and thereby accommodate the enlarged portions of film between the flanges. The bias, however, is strong enough to provide the required gripping action on the film as previously described.

Figure 8:
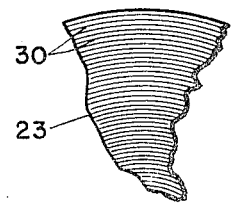
FIG. 8 is an enlarged fragmentary view of the inner surface of a storage reel.
Figure 6:
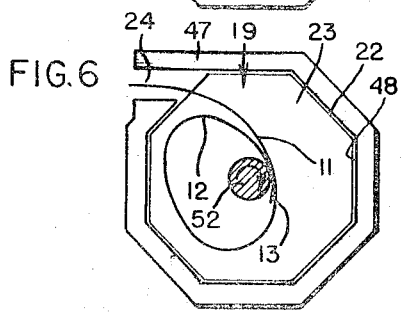

It may be desirable to roughen one or more of the inner surfaces of the flanges to enhance the frictional gripping action of the flanges of the supply and takeup reels on the widened regions of the film. This may be done in any suitable manner. In the illustrated embodiment, as shown in FIG. 8, the roughening is accomplished by providing a series of shallow grooves 30 in a fine pitch spiral pattern on the inner surface of one or both flanges.

It may therefore be seen that the invention provides an improved film handling system and improved supply and takeup mechanisms for use therein. Supply and takeup of the film is accomplished by simple means which are uncomplicated and inexpensive. The system is readily adaptable to cartridge type mechanisms as illustrated. Modification of the film necessary for proper operation is simple and may be accomplished by unskilled operators in a very short period of time.

Various modifications of the invention in addition to those shown and described herein will become apparent to those skilled in the art from the foregoing description and accompanying drawings. Such modifications are intended to fall within the scope of the appended claims.

I claim:

1. A film supply mechanism for storing and supplying resilient film having a region of enlarged width proximate one end and a portion between the region of enlarged width and said one end, said supply mechanism comprising, a supply reel supported for rotation and having flanges spaced greater than the width of the film but less than the width of the enlarged region of the film to grip the enlarged region while permitting said portion of the film between the enlarged region and the one end of the film to extend tangentially of the remainder of the film when the film is wound on said reel, and a housing having a curved inner surface and a passage with a surface tangentially intersecting said inner surface for guiding the projecting one end of the film to cause it to emerge from said housing through said passage upon rotation of said supply reel.

2. A film handling system comprising, resilient film having at least one region of enlarged width proximate one end and a portion between the region of enlarged width and said one end, a supply mechanism for storing said film, said supply mechanism comprising a supply reel supported for rotation and having flanges spaced greater than the width of the film but less than the width of the enlarged region of the film to grip the enlarged region while permitting said portion of the film between the enlarged region and the one end of the film to extend tangentially of the remainder of the film when the film is wound on said reel, said supply mechanism further comprising a housing having a curved inner surface and a passage with a surface tangentially intersecting said inner surface for guiding the projecting one end of the film to cause it to emerge from said housing through said passage upon rotation of said supply reel, means outside said housing and adjacent said passage for gripping the emerging end of the film and transporting the film from said supply mechanism, and a takeup mechanism for receiving said film from said transporting means.

3. A film supply mechanism according to claim 1 wherein said housing includes means projecting from said curved inner surface between said flanges of said supply reel for guiding the enlarged region between said flanges to be gripped thereby when the film is rewound on said supply reel.

4. A film supply mechanism according to claim 2 wherein said projecting means comprise a hump integral with said curved inner surface of said housing.

5. A takeup mechanism for receiving resilient film having a region of enlarged width proximate one end, said takeup mechanism comprising, a takeup reel, means for rotating said takeup reel with a tangential velocity near the periphery thereof which is substantially higher than the longitudinal velocity at which the film is introduced thereinto, said takeup reel having flanges spaced greater than the width of the film but less than the width of the enlarged region of the film, a film guide defining an inner guiding surface, said film guide having a passage therein with a further guiding surface intersecting said inner guiding surface, said inner guiding surface being of a configuration such that at least a portion thereof is positioned within the periphery of said flanges during part of each revolution of said reel for guiding the film into the space between said flanges, at least one of said flanges corresponding in outline to said inner guiding surface and being of a size to permit said takeup reel to be inserted in and removed from said film guide when said one flange is oriented in correspondence with said inner guiding surface.

6. A takeup mechanism according to claim 5 wherein said inner guiding surface is of polygonal outline, and wherein said one flange is of corresponding polygonal outline.

7. A film handling system comprising, a resilient film having at least one region of enlarged width proximate one end, a supply mechanism for storing said film, said supply mechanism including a supply reel supported for rotation and having flanges spaced greater than the width of said film but less than the width of said enlarged region of said film, a housing for containing said supply reel, said housing having a curved inner surface and a passage having a surface tangentially intersecting said curved inner surface for guiding the one end of said film to cause it to emerge from said housing through said passage upon rotation of said supply reel, said housing including means projecting from said curved inner surface between said flanges of said supply reel for guiding said enlarged region of said film therebetween to be gripped thereby, a takeup mechanism for receiving said film from said transporting means, said takeup mechanism including a takeup reel, means for rotating said takeup reel with a tangential velocity near the periphery thereof which is substantially higher than the longitudinal velocity at which said transporting means move said film, said takeup reel having flanges spaced greater than the width of said film but less than the width of said enlarged region of said film, a film guide defining an inner guiding surface and having a passage therein with a further guiding surface intersecting said inner guiding surface, said inner guiding surface being of a configuration such that a portion thereof is positioned between the periphery of said flanges during at least part of each revolution of said reel for guiding the film into the space between said flanges, and wherein said one flange is of corresponding outline to said inner guiding surface and is of a size to permit said takeup reel to be inserted in and removed from said film guide with said one flange oriented in correspondence with said inner guiding surface.